United States Patent [19]

Bubam et al.

[11] Patent Number: 4,661,557

[45] Date of Patent: Apr. 28, 1987

[54] PREPARATION OF STABLE AQUEOUS POLYMER DISPERSIONS WHICH CONTAIN AN ALKENYL-AROMATIC COMPOUND AS COPOLYMERIZED UNITS

[75] Inventors: Hans-Georg Bubam; Lothar Heider, both of Ludwigshafen; Uwe Biederbeck, Mutterstadt; Bernd Stanger, Dudenhofen, all of Fed. Rep. of Germany

[73] Assignee: BASF Aktiengesellschaft, Ludwigshafen, Fed. Rep. of Germany

[21] Appl. No.: 749,542

[22] Filed: Jun. 27, 1985

[30] Foreign Application Priority Data

Jun. 28, 1984 [DE] Fed. Rep. of Germany ....... 3423765

[51] Int. Cl.$^4$ ............................................. C08K 5/07
[52] U.S. Cl. ................................. 524/770; 524/819; 524/822; 524/823; 524/824; 524/354
[58] Field of Search ............... 524/817, 819, 820, 821, 524/770, 354, 822, 823, 824

[56] References Cited

U.S. PATENT DOCUMENTS

| | | |
|---|---|---|
| 2,378,089 | 6/1945 | Krotzer et al. |
| 2,767,153 | 10/1956 | Sutton .................. 524/820 |
| 2,859,193 | 11/1958 | Kowalewski ......... 524/354 |
| 2,878,211 | 3/1959 | Jenkins et al. ....... 524/354 |
| 2,946,760 | 7/1960 | De Witt et al. ...... 524/354 |
| 3,015,642 | 1/1962 | Bawn et al. .......... 524/819 |
| 3,401,134 | 9/1968 | Fantl et al. ........... 524/820 |
| 3,769,251 | 10/1973 | Wiest et al. .......... 524/819 |
| 3,784,498 | 1/1974 | Ceska ................... 524/819 |
| 3,819,557 | 6/1974 | Loeffler et al. ...... 524/819 |
| 4,052,348 | 10/1977 | Harris et al. ......... 524/354 |
| 4,193,902 | 3/1980 | Mondt et al. ........ 524/820 |
| 4,200,563 | 4/1980 | Komiya ................. 524/817 |
| 4,332,860 | 6/1982 | Heins et al. .......... 524/817 |
| 4,336,172 | 6/1982 | Marquardt et al. ... 524/820 |
| 4,540,739 | 9/1985 | Midgley ............... 524/819 |

FOREIGN PATENT DOCUMENTS

| | | |
|---|---|---|
| 0674672 | 1/1965 | Belgium . |
| 2052984 | 5/1971 | Fed. Rep. of Germany ...... 524/819 |
| 0142346 | 6/1980 | Fed. Rep. of Germany ...... 524/819 |
| 0036576 | 2/1985 | Japan ................... 524/819 |
| 0713492 | 8/1954 | United Kingdom ............... 524/819 |
| 0745383 | 2/1956 | United Kingdom ............... 524/819 |
| 0745927 | 3/1956 | United Kingdom ............... 524/819 |
| 0862372 | 3/1961 | United Kingdom ............... 524/354 |
| 998188 | 9/1961 | United Kingdom . |
| 1032058 | 6/1966 | United Kingdom ............... 524/819 |

*Primary Examiner*—Joseph L. Schofer
*Assistant Examiner*—J. M. Reddick
*Attorney, Agent, or Firm*—Oblon, Fisher, Spivak, McClelland & Maier

[57] ABSTRACT

A process for the preparation of stable aqueous polymer dispersions which contain an alkenyl-aromatic compound as copolymerized units, by polymerizing monomer mixtures which contain (a) not less than 2% by weight of an alkenyl-aromatic compound and (b) from 0.5 to 10% by weight of an ethylenically unsaturated $C_3$-$C_5$-carboxylic acid and/or its amide and/or its nitrile and/or an ethylenically unsaturated monomer containing sulfonic acid groups, with or without (c) acrylic acid esters, methacrylic acid esters and/or butadiene in aqueous emulsion in the presence of a polymerization initiator, with or without an emulsifier and with or without a polymerization regulator, at a pH below 7, in the presence of from 0.2 to 2% by weight of formaldehyde.

1 Claim, No Drawings

PREPARATION OF STABLE AQUEOUS POLYMER DISPERSIONS WHICH CONTAIN AN ALKENYL-AROMATIC COMPOUND AS COPOLYMERIZED UNITS

BACKGROUND OF THE INVENTION

1. Field of the Invention

This invention relates to the preparation of stable aqueous polymer dispersions which contain an alkenyl-aromatic polymer compound.

2. Discussion of the Background

In order to obtain, for example, stable aqueous dispersions based on styrene and acrylic esters or butadiene, the monomers on which the copolymers are based are polymerized, as is well known, in aqueous emulsion using polymerization initiators and emulsifiers, with or without polymerization regulators. About 2–5% by weight, based on the monomers, of an emulsifier, is required to ensure that the polymer particles formed during the polymerization remain dispersed in the aqueous medium. The relatively high emulsifier content of the aqueous polymer dispersion reduces the surface tension of the latter and is responsible for the more or less pronounced foaming of the dispersion during its use. If such dispersions are used as binders in paper-coating compositions, the emulsifier content reduces the binding power of the binder and lowers the wet strength of the paper coated with such a composition.

It is moreover known that polymer dispersions may be prepared in the absence of emulsifiers or in the presence of only small amounts of these. However, this results in a higher amount of coagulate than when preparing dispersions with high emulsifier content.

SUMMARY OF THE INVENTION

It is an object of the present invention to provide stable dispersions of low or zero emulsifier content, which show little foaming during use. It is a further object of the invention to reduce coagulate formation, in the preparation of such dispersions, compared to what is achievable with the conventional processes. It is yet a further object of the invention to provide dispersions which, for example, when used as binders in paper-coating compositions give a coated paper of higher wet strength than that provided by conventional binders.

We have found that these objects are achieved, according to the invention, by a process for the preparation of stable aqueous polymer dispersions, which contain an alkenyl aromatic-compound as copolymerized units, by polymerizing monomer mixtures which contain (a) not less than 2% by weight of an alkenyl-aromatic compound, (b) from 0.5 to 10% by weight of an ethylenically unsaturated $C_3$–$C_5$-carboxylic acid and/or of an amide and/or of a nitrile of an ethylenically unsaturated $C_3$–$C_5$-carboxylic acid and/or of an ethylenically unsaturated monomer containing sulfonic acid groups, with or without (c) acrylic acid esters, methacrylic acid esters and/or butadiene in aqueous emulsion in the presence of a polymerization initiator and of from 0 to 0.6% by weight, based on the mohomers, of an emulsifier, with or without polymerization regulators wherein the polymerization is carried out in the presence of from 0.2 to 2% by weight of formaldehyde, based on the monomers, at a pH below 7.

DETAILED DESCRIPTION OF THE PREFERRED EMBODIMENTS

Suitable monomers of group (a) are alkenyl-aromatic compounds which have, for example, the formula

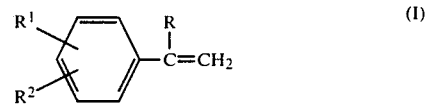

where R is H or $CH_3$ and $R^1$ and $R^2$ are H, $CH_3$, $C_2H_5$ or $C_3H_7$. Preferably, styrene is used from among this group of monomers. The monomer mixture contains not less than 2% by weight of monomers (a) but the proportion of the latter can be up to 99% by weight and is preferably from 20 to 70% by weight.

Monomers of group (b) are ethylenically unsaturated $C_3$–$C_5$-carboxylic acids and/or their amides and/or nitriles and/or ethylenically unsaturated monomers containing sulfonic acid groups. Specifically, the following compounds may be used: acrylic acid, methacrylic acid, itaconic acid, maleic acid, fumaric acid, acrylamide, methacrylamide, acrylonitrile, methacrylonitrile, vinylsulfonate and compounds of the formula

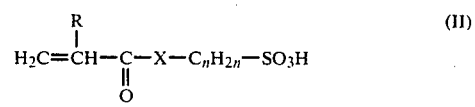

where R is H and $CH_3$, X is —O— or —NH— and n is from 1 to 5.

Suitable sulfo-esters of the formula (II) are, for example, 1-sulfo-2-propyl acrylate, 2-sulfo-1-propyl acrylate, 2-sulfo-1-propyl methacrylate, 2-sulfo-1-butyl acrylate and methacrylate, 1-sulfo-2-butyl acrylate and methacrylate, 3-sulfo-2-butyl acrylate and methacrylate, 2-methyl-2-sulfo-1-propyl acrylate, 2-methyl-1-sulfo-2-propyl acrylate, 3-sulfo-1-propyl acrylate, 3-sulfo-1-butyl acrylate and 4-sulfo-1-butyl acrylate and methacrylate.

Examples of sulfoalkylamides of the formula (II) are 2-acrylamidopropanesulfonic acid, 2-acrylamidoethanesulfonic acid, 2-methacrylamidoethanesulfonic acid, 4-acrylamidobutane-1-sulfonic acid, 3-acrylamidopropanesulfonic acid, 3-methacrylamidopropanesulfonic acid and acrylamidoneopentylsulfonic acid.

Among the said ethylenically unsaturated monomers containing sulfonic acid groups, 2-acrylamido-2-methylpropanesulfonic acid is preferred.

In addition to the above-mentioned amides of ethylenically unsaturated $C_3$–$C_5$-carboxylic acids, it is also possible to use derivatives of these amides, e.g. N-methylolacrylamide, N-methylolmethacrylamide and the corresponding etherified methylol compounds, e.g. N-methoxymethylacrylamide, N-methoxymethylmethacrylamide, N-ethoxymethylacrylamide, N-ethoxymethylmethacrylamide, N-butoxymethylacrylamide and N-butoxymethylmethacrylamide.

The compounds of group (b) can be copolymerized individually, or as mixtures, with the other monomer groups. The individual use of ethylenically unsaturated $C_3$–$C_5$-carboxylic acids or of mixtures of these, for example mixtures of acrylic acid and methacrylic acid or of acrylic acid and itaconic acid, as the monomer or monomers of group (b) is preferred.

Polymer dispersions which give particularly water-resistant coatings when used as binders are obtained if component (b) is a mixture of acrylic acid and acrylamide, methacrylic acid and acrylamide, acrylic acid and methacrylamide, methacrylic acid and methacrylamide, acrylic acid and N-methylolacrylamide or acrylic acid and N-methylolmethacrylamide. The monomer mixtures employed in the polymerization contain from 0.5 to 10, preferably from 1 to 5% by weight of one or more monomers of group (b).

Monomers of group (c) are acrylic acid esters, methacrylic acid esters and/or 1,3-butadiene. The esters are derived from alcohols of 1 to 9 carbon atoms. Preferably, the esters of monohydric alcohols are employed. Examples of suitable acrylic acid esters are methyl acrylate, ethyl acrylate, N-propyl acrylate, isopropyl acrylate, N-butyl acrylate, isobutyl acrylate, hexyl acrylate, 2-ethylhexyl acrylate and octyl acrylate. Corresponding esters of methacrylic acid can be used likewise, as can mixtures of acrylic acid esters and methacrylic acid esters or mixtures of acrylic acid esters with different alcohols, e.g. N-butyl acrylate and methyl acrylate. The monomers of group (c) account for up to 97.5% by weight of the monomer mixture. In addition to the esters of monohydric alcohols, acrylic acid esters and methacrylic acid esters of dihydric alcohols may also be used, for example hydroxyethyl acrylate, hydroxyethyl methacrylate, hydroxypropyl acrylate, hydroxypropyl methacrylate, hydroxybutyl acrylate and hydroxybutyl methacrylate. It is also possible to polymerize mixtures of an acrylic acid ester and butadiene or of an acrylic acid ester and a methacrylic acid ester. The monomers of component (c) preferably account for from 79.5 to 20% by weight of the structure of the copolymers.

The polymerization initiators used are the peroxidic compounds conventionally employed for the emulsion polymerization of ethylenically unsaturated compounds, for example hydrogen peroxide, sodium, potassium and ammonium persulfate, perborates and organic hydroperoxides, e.g. tert.-butyl hydroperoxide, cumene hydroperoxide or pinane hydroperoxide.

Other suitable polymerization initiators are redox catalysts, e.g. mixtures of hydrogen peroxide and ascorbic acid, sodium bisulfite and tert.-butyl hydroperoxide, and adducts of alkali metal bisulfites with formaldehyde or ketones, mixed with peroxidic compounds, e.g. tert.-butyl hydroperoxide or hydrogen peroxide with heavy metal salts, for example iron-II sulfate, being present to increase the efficiency of these polymerization initiators. These initiators are usually employed in an amount of from 0.1 to 1% by weight, based on the monomers to be polymerized.

In order to emulsify the monomers in the aqueous phase and to stabilize the dispersion of polymer particles in water, produced during polymerization, not more than 0.6% by weight, based on monomers, of an emulsifier is used. The emulsifiers are also conventional materials, for example the alkali metal salts of long-chain alkyl-sulfates, derived, e.g., from alkanes of 10 to 18 carbon atoms, oxyethylated phenols and oxyethylated phenol derivatives, containing, for example, from 2 to 40 ethylene oxide units, and sulfuric acid half-esters of oxyethylated phenols or long-chain alcohols.

Where appropriate, polymerization regulators are employed in the process according to the invention, examples being dodecylmercaptan, thioglycol, thioglycolic acid, tribromomethane and diisopropylxanthogen disulfide.

The amount of polymerization regulator used is from 0 to 1% by weight, based on monomers. The polymerization temperature is from 40° to 100° C., preferably from 70° to 90° C.

According to the invention, the polymerization of the monomers is carried out in the presence of from 0.2 to 2, preferably from 0.4 to 0.8% by weight of formaldehyde, at a pH below 7. The formaldehyde may be introduced into the reaction mixture as an aqueous solution, as a polymer (polyformaldehyde) or in the gaseous form. The use of formaldehyde in the polymerization has the effect of greatly reducing the formation of coagulate during preparation of the dispersion, in comparison with conventional methods of preparation.

The dispersions prepared by the novel process have exceptional stability and show only slight foaming during use. Compared to the conventional dispersions, prepared in the absence of formaldehyde, the dispersions obtained by the novel process, when used as binders in paper-coating compositions, give coated papers with improved wet strength. However, the advantageous properties are only achieved if the pH is kept below 7 during preparation of the dispersion. Binder dispersions which give coated papers with particularly good wet strength are prepared at a pH of from 1 to 3. The pH at which the polymerization is to take place is obtained by adding an organic or inorganic acid. Examples of acids suitable for this purpose are formic acid, acetic acid, propionic acid, oxalic acid, phosphoric acid, hydrochloric acid and sul-furic acid. Formic acid, oxalic acid and phosphoric acid are preferred.

The above dispersions are used as binders for paper-coating compositions, as binders for fiber webs, and in the coating of textile and non-textile sheet-like materials, such as films, paper and board. If the dispersion is used as a binder for paper-coating compositions, from 2 to 20 parts by weight of polymer are required per 100 parts by weight of a finely divided filler. The viscosity of the paper-coating compositions can be adjusted by additionally using the conventional co-binders.

In the Examples, parts and percentages are by weight, unless stated otherwise.

EXAMPLE 1

First, two different feeds were prepared. Feed I consisted of 380 parts of water, 20 parts of a 15% strength aqueous sodium lauryl-sulfate solution, 33 parts of a 30% strength aqueous formaldehyde solution, 10 parts of acrylic acid and 990 parts of styrene. Feed II contained 8 parts of sodium persulfate dissolved in 310 parts of water.

220 parts of water, 2 parts of sodium persulfate and 5 parts of feed I were initially introduced into a stirred kettle and heated to 90° C. When this initial charge had reached 85° C., addition of feeds I and II was started. Both were pumped continuously into the stirred kettle, feed I over 3 hours and feed II over 3.5 hours. When all of feed II had been added, the reaction mixture was heated for a further hour at 90° C. Because of the acrylic acid content in feed I, the pH during the polymerization was below 7. A stable aqueous polymer dispersion of about 50% strength was obtained. 15 parts of coagulate were filtered off. The polymer dispersion was used as a binder for paper-coating compositions, in an amount (based on solids content) of from 2 to 20 parts per 100 parts of pigment.

COMPARATIVE EXAMPLE 1

Example 1 was repeated except that the formaldehyde was omitted from feed I. An aqueous polymer dispersion was obtained, from which 105 parts of coagulate were filtered off.

EXAMPLE 2

Feed I was first prepared by mixing 380 parts of water, 27 parts of a 15% strength aqueous sodium laurylsulfate solution, 10 parts of a 30% strength aqueous formaldehyde solution, 20 parts of methacrylamide, 300 parts of n-butyl acrylate and 680 parts of styrene.

Feed II consisted of an aqueous solution of 8 parts of sodium persulfate in 310 parts of water.

220 parts of water, 2 parts of sodium persulfate and 5 parts of feed I were initially introduced into a stirred kettle and the mixture was heated to 90° C. When it had reached 85° C., addition of feeds I and II was started. Feed I was added over 3 hours and feed II over 3.5 hours. When all of feed II had been added, the reaction mixture was kept at 90° C. for a further hour. The pH was 4. A stable polymer dispersion of about 50% strength was obtained. The amount of coagulate filtered off was 8 parts. The dispersion was used as a binder in paper-coating compositions.

COMPARATIVE EXAMPLE 2

Example 2 was repeated except that the formaldehyde was omitted from feed I and that the styrene was replaced by an equal amount of n-butyl acrylate. In this case, the amount of coagulate filtered off was 70 parts.

EXAMPLE 3

First, three different feeds were prepared. Feed I was a mixture of 940 parts of n-butyl acrylate, 50 parts of styrene and 10 parts of acrylic acid. Feed II was an aqueous solution of 5 parts of sodium persulfate in 66 parts of water. Feed III was a mixture of 17 parts of a 30% strength aqueous formaldehyde solution and 33 parts of water.

850 parts of water were heated to 80° C. in a stirred kettle, with exclusion of oxygen. At 80° C., 28 parts of feed II were added and thereafter feeds I, II and III were introduced simultaneously, over 2 hours, with thorough mixing. The reaction temperature was set at 80° C. When all the feeds had been added, the reaction mixture was heated for a further hour at 80° C. Because of the acrylic acid content in feed I, the pH during polymerization was below 7. A stable polymer dispersion of about 50% strength was obtained. The amount of coagulate filtered off was 20 parts. The polymer dispersion was used as a binder in paper-coating compositions.

COMPARATIVE EXAMPLE 3

Example 3 was repeated except that the styrene and formaldehyde were omitted, the styrene being replaced by n-butyl acrylate. A relatively unstable polymer dispersion was obtained, from which 280 parts of coagulate were filtered off.

EXAMPLE 4

First, a feed I was prepared by mixing the following monomers: 395 parts of 2-ethylhexyl acrylate, 395 parts of n-butyl acrylate, 200 parts of styrene and 10 parts of acrylic acid. Feeds II and III were those mentioned under the same numbers in Example 3, and the polymerization was carried out under the conditions described in the said example, at a pH from 4 to 3. A stable aqueous polymer dispersion of about 50% strength was obtained. The amount of coagulate filtered off was 10 parts. The polymer dispersion was used as a binder for fiber webs.

COMPARATIVE EXAMPLE 4

Example 4 was repeated except that the polymerization was carried out in the absence of styrene and formaldehyde, but with the styrene replaced by n-butyl acrylate. A relatively unstable aqueous polymer dispersion was obtained, from which 300 parts of coagulate were filtered off.

EXAMPLE 5

A feed I was first prepared by mixing the following constituents: 480 parts of n-butyl acrylate, 100 parts of methyl methacrylate, 400 parts of styrene, 10 parts of acrylamide and 10 parts of acrylic acid.

Feeds II and III, specified in Example 3, were used in the present example also. The polymerization was carried out under the conditions described in Example 3. The pH in the initial charge was brought to 1.5 by adding 0.3 part of phosphoric acid. A 50% strength stable polymer dispersion was obtained. The amount of coagulate filtered off was 5 parts. The dispersion obtained was used 5 as a binder for paper-coating compositions and gave coated papers of very high wet strength.

COMPARATIVE EXAMPLE 5

Example 5 was repeated except that styrene and formaldehyde were omitted, but the amount of styrene was replaced by n-butyl acrylate. A relatively unstable polymer dispersion was obtained, the amount of coagulate filtered off being 180 parts. When the dispersion thus prepared was used as a binder in paper-coating compositions, the coated papers obtained had a conspicuously lower wet strength than that of the papers prepared using a polymer of Example 5.

EXAMPLE 6

1,900 parts of a 50% strength aqueous sodium lauryl sulfate solution and 30 parts of t-butyl hydroperoxide were initially introduced into a pressure-resistant polymerization reactor. The reactor was then flushed twice with nitrogen, after which it was evacuated.

4,360 parts of water, 160 parts of itaconic acid, 16 parts of sodium pyrophosphate, 100 parts of a 15% strength aqueous sodium lauryl-sulfate solution, 213 parts of a 30% strength aqueous formaldehyde solution, 36 parts of t-dodecylmercaptan, 247 parts of acrylic acid and 4,160 parts of styrene were thoroughly mixed in a mixing vessel for feed I. The mixing vessel was then flushed with nitrogen, 3,440 parts of butadiene were added and 1,510 parts per volume of this monomer emulsion (feed I) were introduced into the polymerization reactor; this part of feed I was heated to 90° C. However, when it had reached 80° C., feed I and feed II were pumped continuously into the reactor (feed II consisted of an aqueous solution of 20 parts of the sodium salt of hydroxymethanesulfinic acid in 285 parts of water). The period of addition of feeds I and II was 3 hours. The polymerization temperature was 90° C. and the pH was from 4 to 5. After completion of the addition of monomer and initiator, the mixture was polymerized for a further hour at 90° C. A stable polymer dispersion of about 50% strength was obtained, from which only 30 parts of a coagulate were filtered off. The dispersion was used as a binder in paper-coating compositions.

COMPARATIVE EXAMPLE 6

Example 6 was repeated except that the formaldehyde was omitted. A relatively unstable polymer dispersion was obtained, from which 700 parts of coagulate were filtered off.

EXAMPLE 7

First, a feed I was prepared by mixing the following monomers: 395 parts of methyl acrylate, 395 parts of n-butyl acrylate, 200 parts of styrene and 10 parts of acrylic acid. Feeds II and III were those mentioned under the same numbers in Example 3, and the polymerization was carried out under the conditions described in the said example, at a pH from 4 to 3. A stable aqueous polymer dispersion of about 50% strength was obtained. The amount of coagulate filtered off was 1 part. The dispersion was used as a binder in paper-coating compositions.

COMPARATIVE EXAMPLE 7

Example 4 was repeated except that the polymerization was carried out in the absence of styrene and formaldehyde, but the styrene was replaced by n-butyl acrylate. A relatively unstable aqueous polymer dispersion was obtained, from which 300 parts of coagulate were filtered off.

EXAMPLE 8

A feed I was first prepared by mixing the following constituents: 480 parts of n-butyl acrylate, 100 parts of methyl acrylate, 400 parts of styrene, 10 parts of acrylamide and 10 parts of acrylic acid.

Feeds II and III, specified in Example 3, were used in the present example also. The polymerization was carried out under the conditions described in Example 3. The pH in the initial charge was brought to 1.5 by adding 0.3 part of phosphoric acid. A 50% strength stable polymer dispersion was obtained. The amount of coagulate filtered off was 5 parts. The dispersion obtained was used as a binder for webs and gave products of high wet strength.

COMPARATIVE EXAMPLE 8

Example 8 was repeated except that the styrene and formaldehyde were omitted, but the total amount of styrene was replaced by n-butyl acrylate. A relatively unstable polymer dispersion was obtained, the amount of coagulate filtered off being 180 parts.

We claim:

1. A process for the preparation of a stable aqueous polymer dispersion containing an alkenyl-based compound as copolymerized unit, said process comprising copolymerizing a monomer mixture
   (a) from 20 to 70% by weight of styrene,
   (b) from 0.5 to 10% by weight of acrylic acid, methacrylic acid or itaconic acid, and
   (c) from 79.5 to 20% by weight of an acrylic acid ester of an alcohol of 1 to 9 carbon atoms, or butadiene, or mixtures thereof,
   in an aqueous emulsion in the presence of (i) a polymerization initiator, (ii) from 0 to 0.6% by weight, based on the monomers, of an emulsifier, and (iii) from 0.2 to 2% by weight of formaldehyde, based on the monomers, at a pH below 7, provided that if monomer (c) is an acrylic acid ester substantially no emulsifier is present.

* * * * *